(12) United States Patent
Bauer et al.

(10) Patent No.: US 7,011,888 B2
(45) Date of Patent: Mar. 14, 2006

(54) PROCESS FOR PROTECTING FIBER-REINFORCED CARBON-CONTAINING COMPOSITES AGAINST OXIDATION

(75) Inventors: Moritz Bauer, Augsburg (DE); Martin Christ, Wehringen (DE); Udo Gruber, Neusaess (DE); Andreas Kienzle, Thierhaupten (DE); Jens Rosenlöcher, Augsburg (DE); Rainer Zimmerman-Chopin, Ellgau (DE)

(73) Assignee: SGL Carbon AG, (DE)

( * ) Notice: Subject to any disclaimer, the term of this patent is extended or adjusted under 35 U.S.C. 154(b) by 355 days.

(21) Appl. No.: 10/314,090

(22) Filed: Dec. 6, 2002

(65) Prior Publication Data
US 2003/0138672 A1 Jul. 24, 2003

(30) Foreign Application Priority Data
Dec. 13, 2001 (DE) ................................ 101 61 218

(51) Int. Cl.
*B32B 5/02* (2006.01)
*B32B 15/14* (2006.01)
*B05D 5/00* (2006.01)

(52) U.S. Cl. .................. 428/446; 428/408; 428/368; 427/343; 427/377; 427/376.2; 427/383.3; 427/383.5; 427/397.8

(58) Field of Classification Search ............ 428/446, 428/408, 368; 427/419.6, 343, 377, 376.2, 427/383.3, 397.8, 383.5
See application file for complete search history.

(56) References Cited

U.S. PATENT DOCUMENTS

| | | | | |
|---|---|---|---|---|
| 5,725,955 A | | 3/1998 | Tawil et al. | |
| 6,030,913 A | * | 2/2000 | Heine et al. | 501/88 |
| 6,231,791 B1 | * | 5/2001 | Heine et al. | 264/29.5 |
| 6,261,984 B1 | * | 7/2001 | Mochizuki et al. | 501/133 |
| 6,527,092 B1 | * | 3/2003 | Gruber et al. | 188/218 XL |
| 6,537,654 B1 | * | 3/2003 | Gruber et al. | 428/293.4 |
| 6,555,173 B1 | * | 4/2003 | Forsythe et al. | 427/376.2 |
| 6,668,984 B1 | * | 12/2003 | Gray | 188/251 R |
| 6,703,117 B1 | * | 3/2004 | Gruber et al. | 428/292.1 |
| 6,759,117 B1 | * | 7/2004 | Bauer et al. | 428/293.4 |
| 6,793,873 B1 | * | 9/2004 | Gadow et al. | 264/646 |
| 6,818,288 B1 | * | 11/2004 | Bauer et al. | 428/293.4 |
| 6,824,862 B1 | * | 11/2004 | Bauer et al. | 428/293.4 |
| 6,838,162 B1 | * | 1/2005 | Gruber et al. | 428/293.4 |

FOREIGN PATENT DOCUMENTS

| | | |
|---|---|---|
| DE | 39 20 450 A1 | 1/1991 |
| DE | 197 10 105 A1 | 9/1998 |
| EP | 0619801 * | 10/1994 |
| WO | WO 93/13033 A1 | 7/1993 |
| WO | WO 01/60763 A2 | 8/2001 |
| WO | WO 02/44106 A2 | 6/2002 |

* cited by examiner

*Primary Examiner*—Deborah Jones
*Assistant Examiner*—Jason L. Savage
(74) *Attorney, Agent, or Firm*—Connolly Bove Lodge & Hutz LLP

(57) ABSTRACT

Process for protecting fiber-reinforced, carbon-containing composites whose matrix comprises, at least in the outer layer, silicon carbide (SiC) and also silicon (Si) and/or silicon alloys against oxidation, which comprises the steps a) impregnation of the composite with an aqueous, phosphate-containing solution, b) drying, c) heat treatment at a temperature which is at least sufficient to convert the dried solution into insoluble compounds which are suitable for forming a self-healing glass, wherein the composite is treated oxidatively to form silicon oxide ($SiO_2$) either prior to step a), between steps a) and b) or during or after step b) and/or c).

26 Claims, No Drawings

PROCESS FOR PROTECTING FIBER-REINFORCED CARBON-CONTAINING COMPOSITES AGAINST OXIDATION

FIELD OF THE INVENTION

The invention relates to a process for protecting fiber-reinforced carbon-containing composites the matrix of which comprises silicon carbide.

BACKGROUND OF THE INVENTION

Fiber-reinforced carbon-containing materials of this type suffer from the problem that the carbon tends to undergo oxidation, in particular in relatively high-temperature applications. This behavior is particularly disadvantageous when shaped bodies used in a high-temperature environment, for example furnace linings, combustion chambers or brake discs of vehicles, are to be made of the carbon-containing material. Brake discs are, for example, manufactured from composites reinforced with carbon fibers and having a ceramic matrix such as C/SiC materials (silicon carbide containing Si and/or C phases and reinforced with carbon fibers). In the case of such brake discs, undesirable burning has in the past been observed at operating temperatures of from abut 600° C. to above 1000° C.

Starting points for protecting these materials against oxidation are therefore known from the prior art. For example, EP 0 619 801 B1 describes a process of this generic type for protecting fiber-reinforced, carbon-containing composites whose matrix comprises silicon carbide (SiC) at least in the outer layer against oxidation. More precisely, the starting material is formed by a C-SIC material which has a pure SiC matrix which is deposited from the gas phase and in which no free Si is present.

The known process comprises, inter alia, the following steps:
  a) forming an outer coating on the ceramic surface of the composite by means of a composition comprising a mixture of phosphates and silicon oxide and aluminum oxide,
  b) after drying, carrying out a heat treatment at a temperature which is sufficient to convert the outer coating into an insoluble cement which is suitable for forming a self-healing glass.

The outer coating is produced by brushing or spraying the aqueous, phosphate-containing suspension onto the ceramic surface of the composite. The conversion of the coating which forms a cement after heat treatment into a self-healing glass then occurs during the use of the material at an operating temperature which is greater than or equal to the softening temperature or is carried out by means of a further heat treatment above the softening temperature. For the purposes of the present invention, a self-healing glass is a glass which automatically closes surface cracks and damage occurring over time at elevated temperatures and without external intervention.

It is an object of the invention to develop a process of the type mentioned at the outset further so as to achieve improved oxidation protection of the composite material. The production of the material should be carried out in such a way that the process is not significantly more costly or time-consuming compared to methods of production used hitherto.

In contrast to the prior art, in which a fiber-reinforced, carbon-containing composite whose matrix comprises silicon carbide (SiC) but no free silicon (Si) is protected against oxidation, according to the invention it is a composite comprising, at least in the outer layer, not only silicon carbide (SiC) but also silicon (Si) and/or silicon alloys which is protected against oxidation. In conjunction with the additional oxidative treatment, silicon oxide ($SiO_2$) is produced from the silicon (Si) or its alloys present in the matrix. The layer formed in the phosphating step reacts with the free silicon (Si) present in the matrix or a silicon oxide formed therefrom as an intermediate to form a silicate glass having self-healing properties, preferably $Al_2O_3$—$SiO_2$—$P_2O_5$. The presence of silicon in the matrix of the composite therefore has the advantage that formation of the self-healing glass phase occurs during production of the composite. This plays a role, in particular, in the case of vehicle brake discs which are produced from the composite and are subjected to oxidative stresses even before a first use at elevated temperatures, for example when new vehicles from the factory are kept in the open before dispatch to the point of sale. Furthermore, the presence of the silicon bound in the matrix of the initial material accelerates and aids the production of the self-healing glass which is advantageous for affording oxidation protection. This is particularly important when the finished product is used under conditions under which further amounts of the glass-forming $SiO_2$ are continually formed from the matrix and can be incorporated into the self-healing glass. Finally, this results in better bonding of the glass phase to the composite because the silicon is already present in the matrix of the latter and is not applied only to the surface as in the prior art.

DETAILED DESCRIPTION OF THE PREFERRED EMBODIMENTS

Advantageous embodiments of the invention are defined in the subordinate claims, with the invention providing not only the process but also the material obtained therefrom and appropriately configured shaped bodies such as brake discs, brake linings or clutch discs.

The starting material for the process of the invention is accordingly a fiber-reinforced composite ceramic, in particular from the class of C/SiC materials in which preferably carbon-based fibers, in particular carbon fibers or graphite fibers, are bound in a matrix made up predominantly of SiC, Si and/or Si alloys and C. The C/SiC composite ceramics can also contain other high-temperature-resistant fibers which comprise not only carbon but also further elements such as Si, B, N, O or Ti. In the following and in the claims, the term fibers refers both to individual fibers and to fiber bundles which may be bound by polymers or their pyrolysis products, preferably graphitic carbon.

In the production of C/SiC material, a CFC material is formed first. According to the invention, particular preference is given to the production of a CFP (carbon fiber-reinforced plastic) reinforced with short fiber bundles and comprising carbon fibers or fiber bundles coated with a carbonizable substance and/or with carbon together with fillers and binders, which is pressed to the desired shape, if appropriate using a core, and cured and then carbonized and/or graphitized to form a CFC or C/C shaped body as intermediate product. The shaped bodies are preferably manufactured as brake discs, brake linings or clutch discs and preferably have dimensions close to the final dimensions of the end product. Owing to the good heat resistance of the C/SiC material, it is, however, possible to conceive of any further application in which high temperatures occur, for example as lining elements for furnaces and combustion chambers or as heat shields. Large-area components are usually reinforced with long fibers or fiber mats.

Since the CFC intermediate product still has a relatively low hardness compared to the future composite ceramic, cutting machining operations such as the introduction of holes are preferably carried out on the intermediate product.

The base material is not restricted to CFC materials. It is likewise possible to use further thermally stable ceramic fibers, in particular those based on $SiO_2$, $Al_2O_3$, $ZrO_2$ or SiC, which have been coated with carbon or graphite as fiber material.

The preferably used shaped body made of carbon material reinforced with carbon fibers is subsequently shaped to bring it close to its final shape and is then infiltrated with a silicon melt or a silicon alloy melt at temperatures of about 1600° C. under reduced pressure or under inert gas, resulting in at least part of the carbon of the matrix and/or the fibers being converted into SiC. In addition to silicon, metals of transition groups I to VIII, in particular Ti, Cr, Fe, Mo, B and Ni, can also be used as further constituents of the melt. The liquid infiltration of the shaped CFC body forms a dense, strong and very hard shaped body of C/SiC material comprising fibers, in general carbon fibers, in a matrix consisting predominantly of SiC, Si and C.

As an alternative, the matrix of the shaped body can be produced entirely or partly by gas-phase infiltration (CVD or CVI). The matrix then has a relatively high SiC content, typically above 95%. Furthermore, the matrix can be produced by pyrolysis of Si-containing, preceramic polymers as are formed, for example, by pyrolysis of polymers comprising one or more of the elements Si, B, C, N, P or Ti.

In contrast to the products of the classical SiC sintering processes or gas-phase infiltration with pure SiC, the matrix still contains free silicon resulting from unreacted Si infiltrate. If Fe, Co, Ni, Cu, Cr, Al are used as alloying metals in the infiltration, these metals are, after solidification of the residual melt, preferably dissolved in the Si phase or precipitated. In each of the three cases, the shaped composite body resulting from the respective process therefore comprises a composite ceramic having a matrix of SiC, Si and C in which carbon-containing fibers are embedded.

It is important that the Si content of the matrix is, at least in the outer layer, above 1% by weight. The Si content is preferably in the range from 1 to 30% by weight, based on the total weight of the shaped body or based on the weight of its outer layer permeated by the SiC-containing matrix.

The SiC content of the matrix of the composite ceramic is preferably above 50% by weight, more preferably above 35% by weight, based on the total weight of the shaped body. Depending on the depth of the infiltration by the matrix-forming compounds, this composite ceramic can be restricted to only an outer layer or can extend through the entire shaped body. The proportion by weight of the matrix and its composition can vary within the shaped body, particularly deep inside, with the proportion by weight of the matrix at the surface preferably being greater than in the interior of the shaped body, occasionally even almost 100%.

In a preferred variant, the CFC material is converted into C/SiC by liquid silicization. In this case it is immaterial whether the CFC material is completely or only partly infiltrated with silicon or silicon alloy and converted into C/SiC. It is merely necessary for the outer layer of the shaped body to have been converted into C/SiC; this outer layer can also constitute almost 100% of the matrix. The invention therefore also extends to shaped CFC bodies in which silicization has been carried out only in the outer region while the core still consists of CFC. The thickness of the outer layer which has been converted into C/SiC is at least 0.2 mm, preferably more than 0.5 mm and particularly preferably more than 5 mm.

Owing to the different coefficients of thermal expansion of fibers and matrix, the liquid silicization of CFC leads, after cooling of the material from a process temperature of about 1500 –1900° C. to room temperature, to a matrix permeated by open microcracks and pores, with the open cracks and pores extending far into the inside of the shaped body comprising C/SiC ceramic and forming preferentially on the reinforcing fibers. This likewise applies to the gas-phase infiltration or polymer pyrolysis processes, since the shaped body likewise has to be cooled from a high process temperature to low temperatures. This effect appears particularly when the SiC-containing outer layer has a higher proportion by weight of the matrix than does the interior of the material.

These open cracks and pores provide paths for oxygen to enter the shaped body, so that, in particular, the carbon fibers bound in the matrix, the carbon-coated fibers or the free carbon are exposed to oxidation. The uses of the shaped body at high temperatures and in corrosive media, as are customary for such materials, further increase the oxidative attack.

To form an oxidation protection layer, the shaped body comprising C/SiC composite is firstly impregnated with an aqueous, phosphate-containing solution, for example an aluminum phosphate solution which preferably contains at least 15% by mass of monoaluminum phosphate (Al $(H_2PO_4)_3$).

Further preferred components of the phosphate-containing solution are zinc salts, boron oxide or copper salts. These constituents can occur as significant constituents in the finished self-healing glass, in which case they are typically bound in the glass as phosphates or oxides. The aqueous solution can penetrate deep into the open pores and cracks of the matrix and forms a coating there after drying. A heat treatment at a temperature which is at least sufficient to decompose the aluminum phosphate containing water of crystallization and to convert the coating into insoluble compounds which are suitable for forming a self-healing glass is subsequently carried out.

An oxidative treatment under the same temperature conditions which produces silicon oxide ($SiO_2$) from the silicon (Si) present in the matrix or from its alloys is carried out, preferably during the heat treatment of the previously impregnated shaped body comprising C/SiC composite. The heat treatment is preferably carried out in an oxidizing atmosphere and/or air at a temperature above 480° C. The duration of the heat treatment decreases with increasing temperature. It is from about 4 to 24 hours at 480° C. and less than 1 hour at 800° C.

Carrying out the heat treatment in air represents a significant cost saving compared to the heat treatment under protective gas (for example $N_2$) as employed in the prior art.

Instead of oxidizing the shaped composite body during the heat treatment, this can, in a further embodiment, be carried out prior to impregnation or between impregnation and heat treatment, for example by emission in an oxidizing atmosphere or by means of wet chemical treatment. The wet chemical treatment is typically carried out using oxidizing agents such as perborates or peroxophosphoric acid, preferably in the phosphate solution. It is likewise possible for the composite to be oxidized anodically.

It is also possible for the oxidation to follow the heat treatment, in which case it is advantageous to heat the coating to a temperature significantly above about 480° C. to react the newly formed $SiO_2$ with the layer comprising aluminum phosphate.

It is critical that silicon oxide be generated in the matrix as a result of the oxidative treatment. This together with any remaining free silicon reacts with the phosphation layer and forms a silicate glass having self-healing properties, in the present case, for example, $Al_2O_3$—$SiO_2P_2O_5$. The oxidation protection layer in the form of the glass then completely fills and seals the open cracks and pores in the shaped body which act as oxidation paths and has self-healing properties at temperatures above about 500° C.

As mentioned at the outset, brake discs, brake linings or clutch discs for vehicles are, according to a particularly preferred application of the process of the invention, manufactured from the C/SiC material provided with the oxidation protection layer. In operation, these components can reach temperatures above 500° C., so that the vitreous oxidation protection layer displays its self-healing properties.

EXAMPLE 1

To produce a brake disc with oxidation protection, a disc produced by liquid silicization of a CFC intermediate body according to the process of DE 197 10 105 A1 was used. The silicized brake disc having an outer radius of 350 mm and internal ventilation channels was dried and decreased. The disc was then impregnated under reduced pressure (absolute pressure=about 2 –12 mbar) with an aqueous solution of monoaluminum phosphate (50% by weight). The impregnated disc was then dried at 480° C. in air in the presence of atmospheric oxygen for a number of hours. To measure the protective action, the disc was then exposed to oxidizing conditions at a temperature of 800° C. in a stream of air. On initial heating to 800° C., $SiO_2$ is formed and incorporated into the aluminum phosphate layer.

Compared to an unprotected disc, the weight loss caused by oxidation after an exposure time of 3 hours is decreased by 90%.

EXAMPLE 2

To determine the stability of the protective coating, impregnated discs were produced as described in Example 1. A disc dried at 480° C. was heated to 800° C. and quenched in water. It was then exposed to air at 800° C. as described in Example 1 and the loss in mass caused by combustion was determined. The protective action of the oxidation protection layer was not decreased by quenching in water. Further discs were treated in boiling water for 24 hours. Here too, the protective action of the oxidation protection layer remained unchanged, in contrast to what would have been expected in the case of a pure phosphate glass layer.

An oxidation protection layer produced by phosphation is usually effective only up to temperatures of about 700° C., while at higher temperatures it even promotes burning. In contrast, no appreciable oxidation damage could be observed in the case of the brake discs manufactured from the composite produced according to the invention, even at temperatures of 800° C.

What is claimed is:

1. A process for protecting fiber-reinforced, carbon-containing composites whose matrix comprises silicon carbide (SiC) at least in the outer layer against oxidation, which comprises the following steps:

a) impregnating the composite with an aqueous, phosphate-containing solution,
  b) after drying, carrying out a heat treatment at a temperature which is at least sufficient to convert the dried solution into insoluble compounds which are suitable for forming a self-healing glass,
  c) oxydatively treating the composite at a temperature in excess of 480° C. whereby silicon in the matrix is reacted to silicon dioxide, and
  d) forming a silicate glass by reaction of the silicon dioxide with the material of the phosphation layer,
wherein the oxidation protection is generated on a fiber-reinforced, carbon-containing composite material whose matrix comprises, at least in the outer layer, silicon (Si) and/or silicon alloys in addition to silicon carbide (SiC).

2. The process of claim 1, wherein the composite is treated oxidatively prior to step a).

3. The process of claim 1, wherein the composite is treated oxidatively between steps a) and b).

4. The process of claim 1, wherein the composite is treated oxidatively during step b).

5. The process of claim 1, wherein the composite is treated oxidatively after step b).

6. The process as claimed in claim 1, wherein the silicon content of the matrix at least in the outer layer is above 1% by weight and preferably in the range from 1 to 30% by weight, based on the total weight of the composite or based on the weight of the outer layer permeated by the SiC-containing matrix.

7. The process of claim 6, wherein the silicon content of the matrix in the outer layer is from 1 to 30% by weight.

8. The process of claim 1, wherein the oxidative treatment takes place in air.

9. The process of claim 1, wherein the heat treatment of step b) is effected at a temperature above 480° C.

10. A fiber-reinforced, carbon-containing composite produced by the process of claim 1.

11. A shaped body produced from a composite as claimed in claim 10.

12. A brake disk produced from a composite as claimed in claim 10.

13. A brake lining produced from a composite as claimed in claim 10.

14. A clutch disk produced from a composite as claimed in claim 10.

15. A lining element for lining furnaces produced from a composite as claimed in claim 10.

16. A lining element for lining combustion chambers produced from a composite as claimed in claim 10.

17. A heat shield produced from a composite as claimed in claim 10.

18. A fiber-reinforced, carbon-containing composite produced by the process of claim 1, whose matrix comprises silicon carbide (SiC) at least in the outer layer and has a phosphate-containing glass in the pores and/or on the surface, wherein the matrix further comprises free silicon (Si) and/or free silicon alloys.

19. A composite as claimed in claim 18, wherein the silicon content of the matrix at least in the outer layer is above 1% by weight, based on the total weight of the material or based on the weight of the outer layer permeated by the SiC-containing matrix.

20. A composite as claimed in claim 18, wherein the glass comprises one or more of the group consisting of aluminum oxide, silicon oxide, phosphorus oxide, zinc oxide, zinc phosphate, and boron oxide.

21. A fiber-reinforced, carbon-containing composite produced by the process of claim 1 which is covered at least partly by a layer of a glass comprising one or more of aluminum oxide, silicon oxide, phosphorus oxide, zinc oxide, zinc phosphate, and boron oxide.

22. A process for protecting fiber-reinforced, carbon-containing composites whose matrix comprises silicon carbide (SiC) at least in the outer layer against oxidation, which comprises the following steps:
   a) impregnating the composite with an aqueous, aluminium phosphate-containing solution to form a coating after drying,
   b) heating at a temperature sufficient to decompose the aluminium phosphate containing water of crystallisation and to convert the said coating into insoluble compounds,
   c) carrying out a wet chemical treatment using oxidising agents, whereby silicon in the matrix is reacted to silicon dioxide, and
   d) forming a silicate glass by heating the coating to a temperature significantly above about 480° C. to react the silicon dioxide formed in step c) with the layer comprising aluminium phosphate.

23. The process of claim 22, wherein the wet chemical oxidation is carried out by means of perborates, peroxophosphoric acid.

24. The process of claim 22, wherein the wet chemical oxidation is carried out by means of anodic oxidation.

25. The process of claim 22, wherein the aqueous solution comprises at least 15% by mass of monoaluminium phosphate (Al(H2PO4)3).

26. The process of claim 22, wherein the aqueous solution comprises soluble compounds of the elements Zn, Cu and/or B.

* * * * *